Dec. 6, 1949  E. MERTEN  2,490,595
HYDROPHONE
Filed June 16, 1947

Inventor: Eugen Merten
By His Attorney:

Patented Dec. 6, 1949

2,490,595

UNITED STATES PATENT OFFICE 2,490,595

HYDROPHONE

Eugen Merten, Houston, Tex., assignor to Shell Development Company, San Francisco, Calif., a corporation of Delaware Application June 16, 1947, Serial No. 754,976

3 Claims. (Cl. 177—352)

This invention relates to seismic prospecting apparatus and pertains more particularly to apparatus capable of detecting seismic waves when located in a body of water. Such devices are commonly known as hydrophones or seismometers.

The art of seismic prospecting in relatively shallow waters, such as in coastal waters, has gained considerable importance since the discovery of many oil-producing areas in such locations. In practice it is customary to lower a charge of explosives into a body of water or the floor thereof, where it is detonated after hydrophones or seismometers have also been arranged in suitable positions in the same body of water. The hydrophones are connected by means of cables to an amplifying and recording system which is generally located on a nearby ship. From the recorded data transmitted from the hydrophones it is possible for trained operators to acquire considerable information concerning the sub-surface strata of that portion of the surface of the earth being studied.

A hydrophone is a device capable of underwater operation which is adapted to receive the mechanical or sound wave energy of a distant underwater bomb explosion and to convert said energy to electric energy. Most hydrophones consist of a watertight housing containing an electroacoustic device of a magnetic, electromagnetic, condenser, or other type which is coupled to a pressure-transmitting diaphragm arranged in the housing wall in contact with the surrounding liquid in such a way that the sound impinging on the diaphragm is transmitted mechanically to the electroacoustic device which converts this mechanical energy to electric energy.

A hydrophone of the magnetic or electromagnetic type comprises a magnet or electromagnet having, in its air gap, a movable armature operatively connected to a diaphragm adapted to be actuated by pressure waves. These waves, travelling through the water from the point of an explosion, impinge upon the diaphragm and cause the armature to oscillate with regard to the magnet. Thus, electric currents are generated in response to the pressure waves impinging upon the diaphragm. These electric currents are transmitted by a cable to an amplifier and a recorder. A capacity hydrophone has, located in its housing and attached to a diaphragm, a condenser so designed that the seismic waves impinging upon the diaphragm produce a relative displacement of the plates of the condenser. Variations of capacity are used to introduce electrostatically a varying electromotive force in an auxiliary circuit.

This invention relates mainly to the class of hydrophones operated by a pressure-transmitting diaphragm comprising a thin sheet of flexible material or metal attached in a watertight manner to one side of the hydrophone housing, usually the bottom. Best results are obtained from the instrument when the diaphragm is subjected to no strains or pressures other than the ones introduced by the impinging pressure waves and when the movable armature operatively connected to said diaphragm maintains at all times a position substantially equidistant from the faces of the poles of the surrounding magnet. Since the hydrophone is submerged at varying depths and at varying angles on the ocean bottom, the diaphragm is necessarily subjected to varying hydrostatic pressures depending on the depth of submersion, and to forces tending to tilt the armature against the magnet.

For purposes of increased sensitivity and optimum response to the particular character and the low frequencies of pressure impulses useful in submarine seismic work, seismic hydrophones are generally provided with a soft membrane of relatively large area, small thickness and high flexibility or resiliency. Pressure impulses impinging on such a membrane often displace, bend or temporarily deform the membrane in directions which are not perpendicular to the plane of the membrane over certain portions of its area. This causes the voltage-producing element, such as a coil, which is attached to the membrane, to move in a direction other than that desired, which is normally parallel to the axis of the coil, thus causing a distortion of the signal produced.

It is therefore a primary object of this invention to provide a hydrophone of the diaphragm type having means for resiliently suspending a coil within an air gap of a magnet, said means being adapted to prevent any motion of the coil in directions transverse to the axis of the coil.

It is also an object of this invention to provide a hydrophone of the diaphragm type having means adapted to compensate for varying hydrostatic pressures.

Another object of this invention is to provide a hydrophone of the diaphragm type having a second diaphragm that is more flexible and expansible than the pressure-transmitting diaphragm and is thus adapted to compensate for varying hydrostatic pressures to which the hydrophone may be subjected.

In accomplishing these and other objects of the invention an improved structure has been provided, the preferred form of which is illustrated in the accompanying drawing, wherein.

Briefly, the electrodynamic hydrophone or seismometer comprises a streamlined casing adapted for towing, a seismometer housing enclosed in said casing, a central chamber in said housing having located therein means providing a magnetic field within an air gap, a coil, means for resiliently suspending said coil within said air gap, two openings through the housing wall to said central chamber, a pressure-transmitting diaphragm closing one of the openings, means operatively connecting the diaphragm to the coil or armature, said means being adapted to prevent any substantial displacement or motion of the coil in a direction transverse to the axis of the coil, and a second diaphragm closing the other opening in said housing wall, both diaphragms having surfaces in contact with the liquid outside the housing.

Figure 1:
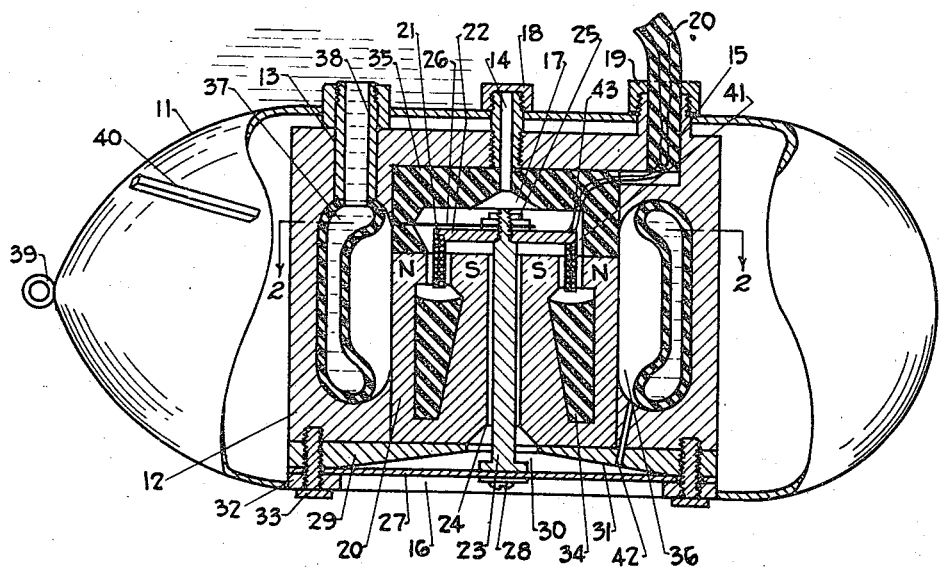
Fig. 1 is a diagrammatic view in vertical cross section of a particular embodiment of the hydrophone, according to the present invention.
Figure 2:
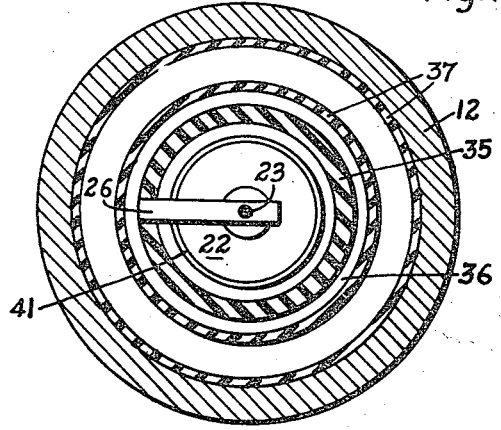
Figure 2 is a cross-sectional view taken along the line 2—2 of Figure 1.
Figure 3:
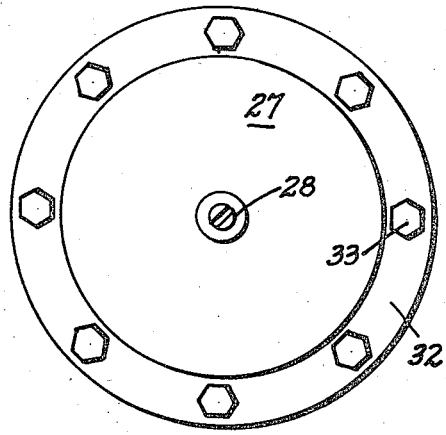
Figure 3 is a bottom view of the hydrophone diaphragm 27 of Figure 1.

Fig. 1 shows an electrodynamic hydrophone or seismometer 10 enclosed in a streamlined protective casing 11. The seismometer unit comprises a housing 12 having three openings 13, 14 and 15 through the top and a considerably larger opening 16, preferably of circular shape, at the bottom. The center opening 14 in the top of the housing 12 is for the introduction of a fluid, such as air, to a central chamber 17 within the housing. This opening 14 is normally closed by a fluid-tight cap 18 while another opening 15 is closed by a cap 19 having a perforation for admitting, in fluid-tight fashion, an insulated conductor cable 20 that leads to the recording equipment (not shown).

Located in the central chamber 17 is a seismometer comprising means providing a magnetic field, such as a cylindrical magnet 20 having opposite pole faces N and S forming the walls of an annular air gap 41 coaxially with said magnet. An armature or a coil 21 supported on a frame 22 is positioned in the annular air gap 41, this arrangement being especially advantageous as providing a most efficient means for generating, within a small space, electromotive forces of relatively high magnitude by the intersection of windings of the coil with the flux passing in the air gap between the faces of the opposing poles. The coil 21 is electrically connected, as shown at 43, to the conductors within the cable 20. In seismometer units having a single spring supporting a movable coil in an air gap, it was generally found that it was difficult to obtain a spring sufficiently flat and free from internal stress distributions to suspend the moving system without excessive tilt. Too much tilt allows the coil to be displaced in the air gap transversely to the axis of the coil thus causing errors to be introduced to the seismic survey. The use of flat springs is desirable as it enables a compact seismometer unit to be enclosed in a small housing or casing.

It was found that improved suspension of the coil 21 in the air gap 41 was attained and scraping of the coil against the magnet was eliminated by attaching the coil frame 22 to an elongated rod 23 which was passed through an axial bore 24 formed in the magnet 20. Such an axial bore 24 decreases the useful flux in the magnet 20 by less than 2 per cent. The rod 23 is securely attached by a nut 25 at one end to a flat cantilever spring 26, and is anchored at the other end to the center of a pressure-transmitting plate or diaphragm 27 by means of a screw 28. Both the bore 24 and the rod 23 are machined with precision to provide between them a clearance permitting free motion of the rod within the bore, in an axial direction, but substantially eliminating any motion transverse thereto. The length of the rod 23 should preferably be greater than the diameter of the armature 21. Thus, the armature 21 is movably suspended in the air gap of the magnet 20 and yet is suspended in a manner which prevents the armature from transverse displacement in the air gap 41 whenever the seismometer unit is located in a tilted position on the ocean floor. Likewise, when an impinging pressure impulse tends to bend or deflect the central portion of the diaphragm 27 in a direction which is not perpendicular thereto, the rod 23 transmits to the coil 21 only that component of the membrane's displacement which acts in the direction of the axis of the rod 23 and coil 21. The magnet 20 is held in the central chamber by a plate 29 which has a central aperture 30, through which the rod 23 passes, and a central beveled portion 31 which permits flexing of the diaphragm 27.

The diaphragm 27 is securely mounted between the plate 29 and a holding ring 32, said ring, plate and diaphragm being secured in fluid-tight attachment to the housing 12 by bolts 33. Portions of the space in central chamber 17, such as the hollow parts within the magnet 20 and the space above said magnet may be substantially filled with an insulating material as at 34 and 35 such as a plastic to reduce the amount of compressible fluid inside said chamber.

Surrounding the seismometer unit is an annular chamber 36 coaxial with the cylindrical magnet in communication with the fluid filled cavities of the housing 12 through conduit means such as channel 42. Located within said annular chamber 36 is an impermeable, flexible, annular tube 37 constructed of any elastic rubberlike material. The inside of the tube 37 is in communication at all times with the space outside the casing 11 through a conduit 38 fitted in fluid-tight fashion to the tube 37 through opening 13. The casing 11 may be equipped with a ring 39 for towing and with fins or vanes 40 which cause said casing to rise in the water during towing thus clearing any obstacles on the ocean floor.

In operation the hydrophone 10 is towed to or dropped at any desired location by a cable attached to the towing ring 39. Before lowering the instrument into the water, a small amount of air may be pumped through opening 14 into the hydrophone so as to deflate and collapse the rubber tube 37 in the annular chamber 36. As the hydrophone is lowered in the water the diaphragm 27 on the bottom of the instrument is subjected to increasing hydrostatic pressure. At the same time, water is forced through conduit 38 into the flexible, annular tube 37 causing said tube to expand and to compress the air inside the hydrophone housing, thus exerting an equalizing pressure on the inside wall of the diaphragm 27 and allowing it to remain substantially unflexed in its normal position. The hydrostatic pressure is thus utilized to flex the more elastic and more expansible diaphragm or annular tube 37 to remove any undue strain from the pressure-transmitting diaphragm 27.

Although the compensating element 37 may be made of any desired shape, it is shown in its preferred form as an annular tube with an open conduit in communication with the outside of the housing, said form providing for a large surface area to which the equalizing liquid pressure may be applied, without at the same time requiring an undue increase in size of the hydrophone. The fluid used inside the housing is normally air but any other inert gas or liquid may be used. A liquid such as oil may likewise be used instead of air to supply a damping effect to the oscillating armature, which may be desirable under certain conditions.

I claim as my invention:

1. A seismic hydrophone comprising a fluid-tight housing having a conical cavity formed in the walls thereof, a circular pressure responsive diaphragm stretched in fluid-tight manner over said cavity, a rod fixedly connected at one end to the center of said diaphragm normally thereto, magnet means having an annular air gap mounted in said housing, a coil coaxially affixed to the free end of said rod, spring means affixed to said housing and the free end of said rod resiliently supporting said coil for axial motion in said gap, an axial passage in said magnet means forming guide means surrounding said rod there being a close clearance between said passage and said rod to permit axial movement while substantially preventing transverse movement of said rod, whereby diaphragm deflections are transmitted to said coil solely in the direction of the axis of said rod, insulated conductor means passing through the walls of the casing and electrically connected to said coil, an annular chamber surrounding said magnet means coaxially therewith, fluid passage means in communication between said chamber and the conical cavity in the wall of said housing, a closed annular tubular member having resilient walls normally held within said chamber in a collapsed condition, and means comprising a conduit in communication through the walls of the housing between the inside of said tubular member and the outside of said housing for expanding said tubular member, thereby equalizing through said fluid passage means the pressures on the inner and the outer side of the diaphragm.

2. A seismic hydrophone comprising a fluid-tight housing having a conical cavity formed in the walls thereof, a circular pressure responsive diaphragm stretched in fluid-tight manner over said cavity, a rod fixedly connected at one end to the center of said diaphragm normally thereto, magnet means having an annular air gap mounted in said housing, a coil coaxially affixed to the free end of said rod, spring means affixed to said housing and the free end of said rod resiliently supporting said coil for axial motion in said gap, an axial passage in said magnet means forming guide means surrounding said rod there being a close clearance between said passage and said rod to permit axial movement while substantially preventing transverse movement of said rod, whereby diaphragm deflections are transmitted to said coil solely in the direction of the axis of said rod, insulated conductor means passing through the walls of the casing and electrically connected to said coil, a chamber in said housing, communication means between the chamber and the conical cavity in the housing wall, port means in said housing wall to said chamber and an expansible diaphragm closing said port means.

3. An apparatus for use in underwater seismic surveying operations, said apparatus comprising a fluid-tight housing having a cavity formed in the walls thereof, a resilient pressure responsive diaphragm closing said cavity in fluid-tight manner, a rod affixed at one end to the center of said diaphragm substantially perpendicularly thereto, magnet means having an annular air gap mounted in said housing, a coil coaxially affixed to said rod near the free end thereof, spring means affixed to said housing and the free end of said rod resiliently supporting said coil for axial motion in said gap, an axial passage in said magnet means forming guide means surrounding said rod, there being a close clearance between said passage and said rod to permit axial movement while substantially preventing transverse movement of said rod, whereby diaphragm deflections are transmitted to said coil solely in the direction of the axis of said rod, insulated conductor means passing through the walls of the casing and electrically connected to said coil, a chamber in said housing, communication means between the chamber and the cavity in the housing wall, port means in said housing wall to said chamber, and expansible diaphragm means closing said port means.

EUGEN MERTEN.

REFERENCES CITED

The following references are of record in the file of this patent:

UNITED STATES PATENTS

| Number | Name | Date |
| --- | --- | --- |
| 1,557,048 | Hahnemann | Oct. 13, 1925 |
| 2,069,242 | Graham | Feb. 2, 1937 |
| 2,311,079 | Parr | Feb. 16, 1943 |
| 2,372,056 | Broding | Mar. 20, 1945 |
| 2,405,179 | Black | Aug. 6, 1946 |
| 2,411,865 | Bostwick et al. | Dec. 3, 1946 |
| 2,423,970 | Gardner | July 15, 1947 |

FOREIGN PATENTS

| Number | Country | Date |
| --- | --- | --- |
| 556,194 | Germany | Aug. 4, 1932 |